United States Patent Office 3,065,222
Patented Nov. 20, 1962

3,065,222
CATION EXCHANGE STARCHES WHICH RETAIN THEIR ORIGINAL GRANULAR FORM AND PROCESS FOR MAKING SAME
Austin L. Bullock and John D. Guthrie, New Orleans, La., assignors to the United States of America as represented by the Secretary of Agriculture
No Drawing. Original application May 24, 1960, Ser. No. 31,492, now Patent No. 2,992,215, dated July 11, 1961. Divided and this application Dec. 20, 1960, Ser. No. 81,914
2 Claims. (Cl. 260—233.3)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to improved starch products having ion exchange properties and to processes for making them, while retaining the original granular structure of native starch.

One of the barriers to making certain ion exchange starches of relatively high ion exchange capacity is that starch readily dissolves or disperses in the reagents required for attaching the desired ionic group to the starch molecule. Thus, when certain processes suitable for chemically modifying cellulose to introduce ionic groups are applied to granular starch, the starch disperses or dissolves under the conditions required for chemical modification. Although the starch may become chemically modified, it loses its original granular structure and becomes a polyelectrolyte rather than an insoluble, non-dispersing, ion exchange material suitable for use in chromatographic columns in the separation of chemical substances, especially those of biochemical significance.

We have discovered that prior crosslinking of the starch by a process that does not destroy its original granular structure, permits it to be chemically modified by reagents and under conditions that would produce a non-granular, dispersed material when applied to granular starch that was not crosslinked. The invention thus provides chemically modified starch products having ion exchange uses and which retain the original granular structure desired for use in ion exchange chromatagraphic separation of chemical compounds. The starch products provided have the further advantage of retaining their granular structure in cold aqueous solutions, dilute acids or bases, or in boiling water, which makes them particularly suitable for certain chemical uses.

The preferred way of practicing the invention consists of crosslinking the native, granular starch with formaldehyde, followed by carboxymethylation, or by the attachment of 12(diethylamino) ethyl groups by ether linkage or by other suitable methods of attaching ionic groups to the starch molecules. The formaldehyde is conveniently provided by paraformaldehyde, which is converted to formaldehyde under the conditions of processing. Free formaldehyde or other sources of formaldehyde could also be used. The native, granular starch is reacted with 2 to 3 percent by weight of formaldehyde in acetone that has been acidified to about pH 2 with a trace of hydrochloric acid. Other acids could be used. The starch is refluxed with the acidified mixture of formaldehyde and actone for 2 to 5 hours, after which it is separated and then etherified with either monochloroacetic acid or 2-chlorotriethyl amine by processes similar to those used for the etherification of cellulose by these reagents. Inasmuch as 20 to 40 percent by weight aqueous solutions of sodium hydroxide is used in etherifications with these or similar compounds, the advantage of using crosslinked starch is readily apparent, inasmuch as ordinary native, granular starch gels and disperses in aqueous sodium hydroxide solutions.

The invention is further illustrated by the following examples:

Example 1

Granular, native starch was crosslinked by suspending 50 parts of the starch and 3 parts of paraformaldehyde in about 200 parts of acetone containing enough dilute hydrochloric acid to give an apparent pH of about 2 and refluxing the mixture for 5 hours with constant stirring. The crosslinked starch was then removed by filtration, washed free of formaldehyde with hot water and dried. Ten parts of the starch, crosslinked as described above, was carboxymethylated by suspending it in a solution containing 17.5 parts of monochloroacetic acid in 10 parts of water, and pouring the mixture slowly with stirring into 100 parts of a 40% sodium hydroxide solution. After cooling the crosslinked carboxymethylated starch was then removed by filtration, washed with water then with acetone and dried. The product retained its granular structure in both water and in dilute sodium hydroxide solution and was useful as an ion-exchange material, having an ion exchange value of 1.33 milliequivalents per gram.

A sample of the original starch lost its granular structure when carboxymethylated in the same manner, forming a very viscous solution which could not be filtered.

Example 2

Granular native starch was crosslinked with formaldehyde by the process of Example 1. Six parts of the crosslinked starch was mixed with 3.5 parts of 2-chlorotriethylamine hydrochloride in 4.5 parts of water. Then 17 ml. of 20% sodium hydroxide was added with thorough mixing. The mixture was then heated in an oil bath held at about 80° C. for 10 minutes. After removal from the oil bath, 50 ml. of 2 molar sodium chloride was added and the product filtered. The product was washed several times with 1 normal NaOH, then with water, 1 N HCl, water, 1 N NaOH and finally with water until the washings were neutral. The water remaining after filtration was removed by washing with 95% ethanol then with absolute ethanol and finally with ether. The sample was then dried under vacuum. The product contained 0.37% nitrogen and when packed in a column was an effective ion exchange material.

When the time of heating in the above procedure was increased to 30 minutes, the product had a trace of brown color and contained 1.06% nitrogen.

This application is a division of Serial No. 31,492, filed May 24, 1960, now Patent No. 2,992,215.

We claim:

1. A process for producing a granular cation exchange material which comprises refluxing native granular starch for from 2 to 5 hours with a solution of pH 2 containing 2 to 3 percent by weight of formaldehyde in acetone acidified with a mineral acid, washing the refluxed starch granules free from formaldehyde with water, drying the washed granules, suspending the dried granules in an aqueous solution of monochloroacetic acid, pouring the suspension into an aqueous solution of about 40 percent by weight of sodium hydroxide, allowing the suspension in sodium hydroxide to cool, washing the cooled suspension first with water then with acetone and finally drying the product to obtain a granular modified starch in which the original granular form of the native starch is retained.

2. A granular cation exchange material comprising an insoluble, nondispersing, chemically modified starch which retains in water, in dilute alkali, and in dilute mineral acid the granular form of the original native starch from which it was prepared, said chemically modified starch having the anhydroglucose chains of adjacent molecules linked by methylene groups and having carboxymethyl groups attached to said anhydroglucose chains by ether linkages.

References Cited in the file of this patent

UNITED STATES PATENTS 2,853,484      Lolkema et al. _____ Sept. 23, 1958